(12) United States Patent
Kim et al.

(10) Patent No.: US 9,970,383 B2
(45) Date of Patent: May 15, 2018

(54) POROUS POLYMER RESIN LAYER AND METHOD FOR MANUFACTURING THE SAME

(71) Applicant: Hyundai Motor Company, Seoul (KR)

(72) Inventors: Bokyung Kim, Gyeonggi-do (KR); In Woong Lyo, Gyeonggi-do (KR); Woong Pyo Hong, Seoul (KR); Hong Kil Baek, Seoul (KR); Kwang Hoon Choi, Gyeonggi-do (KR); Seung Woo Lee, Seoul (KR); Jiyoun Seo, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 107 days.

(21) Appl. No.: 14/929,539

(22) Filed: Nov. 2, 2015

(65) Prior Publication Data

US 2016/0280877 A1    Sep. 29, 2016

(30) Foreign Application Priority Data

Mar. 25, 2015 (KR) .................. 10-2015-0039953

(51) Int. Cl.
| | |
|---|---|
| *C08J 9/35* | (2006.01) |
| *C09D 183/04* | (2006.01) |
| *F02F 1/00* | (2006.01) |
| *C08J 9/00* | (2006.01) |
| *C08J 9/28* | (2006.01) |
| *C08J 9/32* | (2006.01) |
| *F02F 1/18* | (2006.01) |

(52) U.S. Cl.
CPC ............ *F02F 1/004* (2013.01); *C08J 9/286* (2013.01); *C08J 9/32* (2013.01); *C08J 9/35* (2013.01); *C09D 183/04* (2013.01); *F02F 1/18* (2013.01); *C08J 2201/0502* (2013.01); *F02F 1/00* (2013.01); *F05C 2251/04* (2013.01); *F05C 2251/048* (2013.01)

(58) Field of Classification Search
CPC ....... C08J 9/32; C08J 9/35; C08J 9/286; C08J 2201/0502; F02F 1/00; F02F 1/004; F05C 2251/048
See application file for complete search history.

(56) References Cited

U.S. PATENT DOCUMENTS

2012/0326071 A1    12/2012    Pasquero et al.

FOREIGN PATENT DOCUMENTS

| JP | 07-316328 A | 12/1995 |
|---|---|---|
| KR | 2009-0097747 A | 9/2009 |
| KR | 10-2010-0036104 A | 4/2010 |
| KR | 10-2010-0070917 A | 6/2010 |
| KR | 10-1323618 B1 | 11/2013 |

*Primary Examiner* — Hai Vo
(74) *Attorney, Agent, or Firm* — Mintz Levin Cohn Ferris Glovsky and Popeo, P.C.; Peter F. Corless

(57) ABSTRACT

The present invention provides a porous polymer resin layer that comprises a binder resin with pores having a mean maximum diameter of about 0.5 mm to 1.6 mm; and aerogels dispersed in the binder resin. In particular, the porous polymer resin layer has a density of about 0.5 g/ml to 1.6 g/ml.

11 Claims, 2 Drawing Sheets

POROUS POLYMER RESIN LAYER AND METHOD FOR MANUFACTURING THE SAME

CROSS-REFERENCE TO RELATED APPLICATION

This application claims the benefit of priority to Korean Patent Application No. 10-2015-0039953 filed in the Korean Intellectual Property Office on Mar. 23, 2015, the entire contents of which are incorporated herein by reference.

TECHNICAL FIELD

The present invention relates to a porous polymer resin layer and a method for manufacturing the same. The porous polymer resin layer of the present invention may have reduced density, thermal conductivity, and volume heat capacity, thereby having high heat resistance. Accordingly, the porous polymer can be applied to an internal combustion engine and thus can reduce heat energy discharged outside thereby improving efficiency of an internal combustion engine and fuel efficiency of a vehicle.

BACKGROUND

An internal combustion engine converts heat energy generated from combustion of the fuel into mechanical work by action on a piston, a turbine blade, and the like.

The internal combustion engine can be classified into a gas engine, a gasoline engine, a petroleum engine, a diesel engine, and the like, based on types of fuel.

For instance, the petroleum, gas, and gasoline engines are ignited by an electric spark from a spark plug, and the diesel engine sprays fuel into high temperature and high pressure air to spontaneously ignite.

The internal combustion engine also can be classified into a four stroke cycle engine and a two stroke cycle engine based on the stroke/movement of a piston.

The internal combustion engine of a vehicle is commonly known to have thermal efficiency of about 15% to 35%. However, even at the maximum efficiency of the internal combustion engine, about 60% or more of total heat energy may be dissipated as heat energy, exhaust gas, or the like is discharged to outside through the wall of the internal combustion engine.

If the amount of heat energy discharged outside through the wall of an internal combustion engine is reduced, internal combustion engine efficiency may be increased. Thus, studies have progressed on promoting thermal efficiency improvement by forming a heat insulation film of a material with low thermal conductivity on all the wall surfaces, such as top of a piston in a combustion chamber and a cylinder head, to decrease a heat transfer from fuel gas in the combustion chamber to the piston.

However, under the combustion environment of an internal combustion engine, exhaust gas temperature can rise up to a temperature of about 1600° C., the internal temperature of a combustion chamber reaches to about 600° C., and an internal pressure is substantially increased. Thus, high heat resistance and impact resistance may be required for the heat insulation film to be applied inside the internal combustion engine.

To overcome such a problem, a method of mixing a high heat resistant binder resin with low thermal conductivity and ultralow density aerogels with high heat resistance and impact resistance has been suggested to prepare a heat insulation film. Since the aerogel is mainly made of a silicon oxide, carbon, or organic polymer, and it has a porosity of about 90% or greater through a structure where microfilaments with a thickness of one ten thousandth of a hair width are entangled, it may have an excellent heat insulation property, high strength, and excellent sound proofing and impact absorbing properties. However, the heat capacity of the high heat resistant binder resin may not be reduced sufficiently to improve thermal efficiency of an internal combustion engine. Further, when the aerogels are added to the binder resin to decrease heat capacity, adherence of a heal insulation film may be reduced as the content of aerogels increases, and thus the amount of the aerogels is limited.

Therefore, there is a demand for development of a novel resin composition comprising the aerogel that has low volume heat capacity and low thermal conductivity to improve heat resistance.

SUMMARY OF THE INVENTION

In preferred aspects, the present invention provides a porous polymer resin layer that has low density, thermal conductivity, and volume heat capacity and thus may secure substantially improved heat resistance. In particular, when the porous polymer is applied for an internal combustion engine of a vehicle, heat energy discharged outside can be reduced thereby improving internal combustion engine efficiency and fuel efficiency of the vehicle.

In one aspect, the present invention provides a porous polymer resin layer which may comprise: a binder resin comprising pores and an aerogel dispersed in the binder resin. In particular, the pores have a mean maximum diameter of about 0.5 mm to about 1.6 mm, and the porous polymer resin layer may have a density of about 0.5 g/ml to 1.6 g/ml.

The porous polymer resin layer may be used for coating of the inner side of an internal combustion engine or parts of an internal combustion engine.

The porous polymer resin layer may have a thickness of about 20 μm to 2000 μm.

The porous polymer resin layer may have a thermal conductivity of about 0.02 W/mK to 0.8 W/mK, as measured according to ASTM E1461. Further, the porous polymer resin layer may have a volume heat capacity of about 600 KJ/m3K to 2500 KJ/m3K, as measured according to ASTM E1269.

The porous polymer resin layer may comprise an amount of about 0.1 wt % to 10 wt % of the aerogel and the binder resin constituting the balance of the weight of the porous polymer resin layer.

Preferably, the binder resin of the porous polymer resin layer may comprise a non-water soluble silicon resin. In addition, the binder resin may have a weight average molecular weight of about 20,000 g/mol to 300,000 g/mol.

The aerogels in the porous polymer resin may have a specific surface area of about 400 $cm^3/g$ to 600 $cm^3/g$.

In the porous polymer resin layer, an amount of about 2 wt % or less of the binder resin may be present inside the aerogel.

The pores may have a mean maximum diameter from about 0.5 mm to about 0.9 mm, or particularly from about 1.0 mm to about 1.6 mm.

In another aspect, the present invention provides a method for manufacturing the porous polymer resin layer as described above. The method may comprise: conducting a thermal decomposition by increasing a temperature of a polymer resin composition from about 50° C. to about 150° C., at a rate of about 3° C./min to 20° C./min.

Preferably, the polymer resin composition may comprise a binder resin dispersed in a first solvent, and an aerogel dispersed in a second solvent.

The "first solvent" as used herein, refers to a solvent having high boiling point, e.g. of about 100° C., of about 110° C., of about 120° C., or about 130° C., of about 140° C., of about ° C. or greater, an aqueous solution, or polar solvent. The "second solvent" as used herein refers to a solvent having a boiling point less than the first solvent, and the second solvent may be immiscible with the first solvent.

The solid content of the binder resin in the first solvent may be from about 5 wt % to about 75 wt %; and the solid content of the aerogel in the second solvent may be from about 5 wt % to about 75 wt %. In particular, a boiling point of the first solvent may be greater than the second solvent by about 10° C. or greater; and the first solvent may have a boiling point of about 110° C. or greater.

The method may further comprise: heat treating the polymer resin composition at a temperature of about 50° C. to 90° C., before conducting the thermal decomposition. In addition, the method may further comprise: heat treating the polymer resin composition at a temperature of about 180° C. to 300° C., after conducting the thermal decomposition.

The thermal decomposition may be conducted by increasing the temperature at a rate of about 3° C./min to 7° C./min. Alternatively, the thermal decomposition may be conducted by increasing the temperature at a rate of about 13° C./min to 17° C./min.

Further provided is a method of manufacturing an internal combustion engine of a vehicle, and the method may comprise coating a porous polymer resin layer as described herein on an inner side of the internal combustion engine.

Still further provided is a method of manufacturing an internal combustion engine of a vehicle which may comprise coating a polymer resin composition as described herein on an outer side of the internal combustion engine or a part thereof.

In other aspects, the present invention also provides a vehicle that comprising a porous polymer resin layer as described herein.

Other aspects of the invention are disclosed infra.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a porous polymer resin layer and a method for manufacturing the same according to various exemplary embodiments will be explained in detail.

Figure 1:
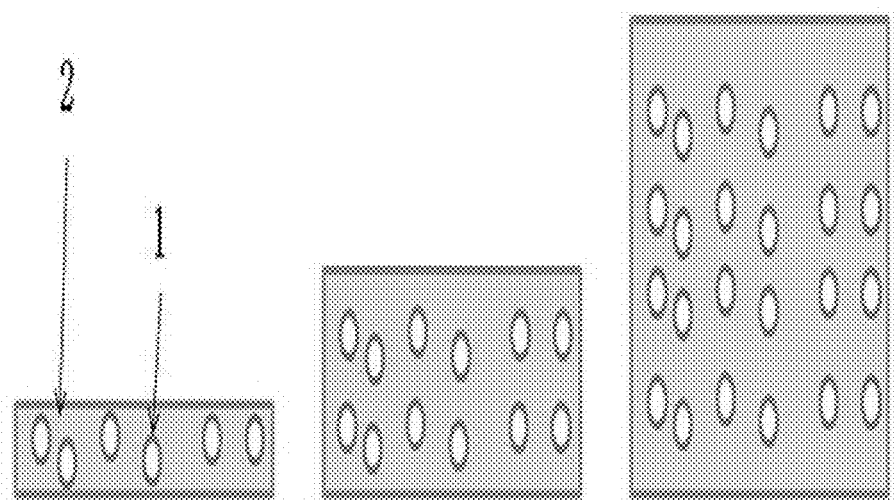
FIG. 1 illustrates an exemplary porous polymer resin layer.
Figure 2:
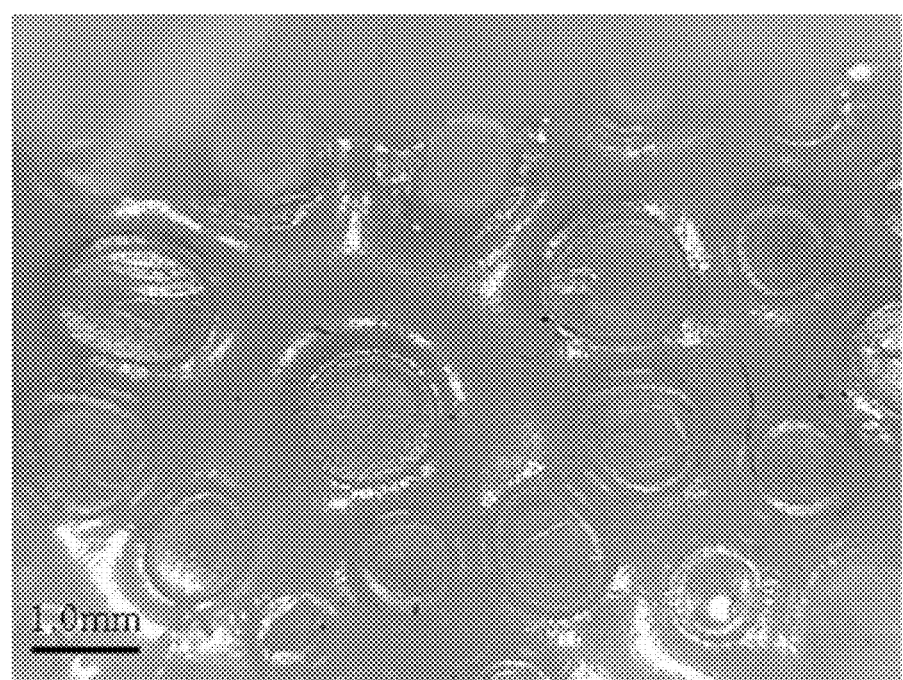
FIG. 2 shows a microscopic view of a surface image of an exemplary porous polymer resin layer obtained in Example 1 according to an exemplary embodiment of the present invention.
Figure 3:
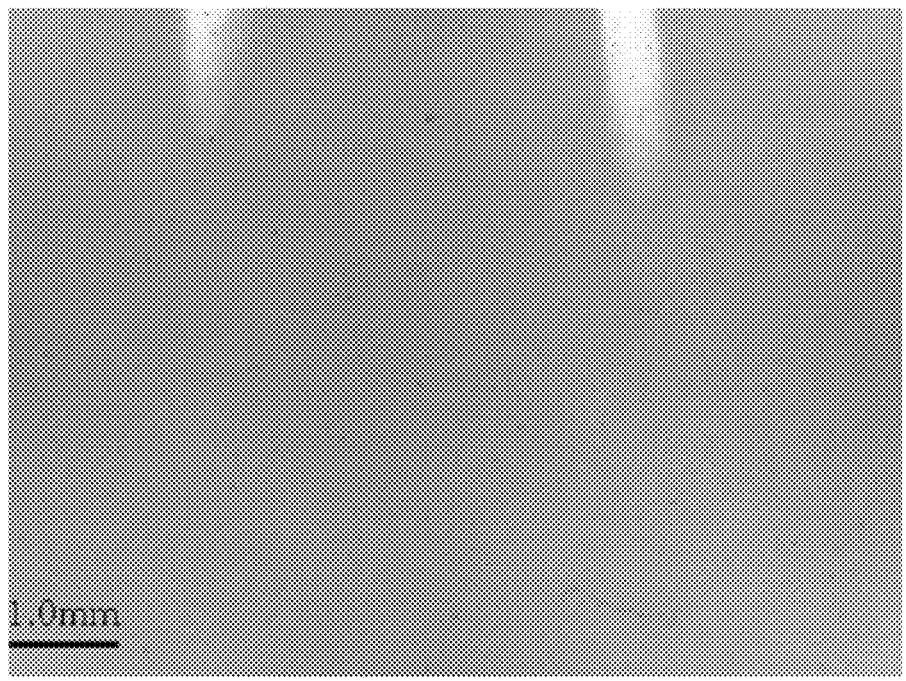
FIG. 3 shows a microscopic view of a surface image of a porous polymer resin layer obtained in Comparative Example 4.

As shown in FIG. 1, a porous polymer resin layer may comprise: a binder resin including pores (1) having a mean maximum diameter of about 0.5 mm to 1.6 mm; and aerogels dispersed in the binder resin (2). Particularly, the porous polymer resin layer may have a density of about 0.5 g/ml to 1.6 g/ml.

The inventors of the present invention confirmed through experiments that in the above-described porous polymer resin layer, the aerogels and the pores may be uniformly dispersed inside the binder resin, while maintaining impact resistance equal to or much better than that of the aerogel, thereby reducing thermal conductivity and volume heat capacity of the porous polymer resin layer to an optimum level. As consequence, heat resistance may be substantially improved.

The aerogel, as used herein, may be a nanoporous material which may provide substantially reduced weight and have an excellent heat insulation property. In particular, particles or polymers inside the aerogel may be three-dimensionally connected such that impact resistance greater than a predetermined level against external impact can be provided. Thus, the aerogel may be a suitable material for improving heat resistance and impact resistance while reducing the density of the porous polymer resin layer.

In order to coat the aerogels on the inner wall of a combustion chamber and the like, it may be mixed with a binder resin having adhesive strength.

The porous polymer resin layer according to an exemplary embodiment may provide a heat insulation material or a heat insulation structure that may be maintained for a long time inside an internal combustion engine to which high temperature and high pressure conditions are repeatedly applied. Further, the porous polymer resin may be used for coating of the inner side of an internal combustion engine or parts of an internal combustion engine.

Meanwhile, the mean maximum diameter of the pores (1) included of the binder resin included in the porous polymer resin may be from about 0.5 mm to about 1.6 mm, from about 0.7 mm to about 1.3 mm, from about 0.75 mm to about 1.2 mm, or particularly from about 0.8 mm to about 1.13 mm.

As described above, the porous polymer resin layer may have high heat resistance due to the pores included there inside, and the mean maximum diameter of the pores may vary according to the type of a solvent used for generating the pores and a temperature condition.

For example, when the pores are formed using a xylene solvent under conditions of vaporizing at a temperature-increasing rate of about 3° C./min to 7° C./min, the mean maximum diameters of pores may be from about 1.0 mm to about 1.6 mm, from about 1.1 mm to about 1.2 mm, or particularly from about 1.11 mm to about 1.13 mm.

Further, the mean maximum diameters of pores that are formed using a xylene solvent under conditions of vaporizing at a temperature-increasing rate of about 13° C./min to 17° C./min may be from about 0.5 mm to about 0.9 mm, from about 0.8 mm to about 0.9 mm, or particularly from about 0.81 mm to about 0.85 mm.

The thickness of the porous polymer resin layer may be from about 20 μm to about 2000 μm, from about 200 μm to about 500 μm, from about 200 μm to about 300 μm, or from about 210 μm to about 250 μm.

As discussed above, since the thermal conductivity and volume heat capacity of the porous polymer resin layer may correspond to physical properties for each unit volume, a thickness change may influence the physical properties.

If the thickness of the porous polymer resin layer is less than about 200 μm, the density of the porous polymer resin layer may not be sufficiently reduced and thus it may be difficult to reduce thermal conductivity sufficiently to an optimum level, and internal anti-corrosion and surface protection functions may be degraded.

To the contrary, if the thickness of the porous polymer resin layer is greater than about 500 μm, cracks may be generated on the porous polymer resin layer.

The density of the porous polymer resin layer may be from about 0.5 g/ml to about 1.6 g/ml, from about 0.5 g/ml to about 1.3 g/ml, or particularly from about 0.52 g/ml to about 1.25 g/ml.

As discussed above, the porous polymer resin layer may include pores together with the aerogels inside, and gas present inside the pores may have increased intermolecular distance. For example, as more pores are generated in the polymer resin, the density of the porous polymer resin layer may further decrease.

Further, the pores may minimize heat transfer by conduction or convection, to thereby decrease thermal conductivity of the porous polymer resin layer.

This may be confirmed through the following Mathematic Equation 1.

$$\lambda(T) = \alpha(T) * Cp(T) * \rho(T) \quad \text{[Mathematic Equation 1]}$$

In the Mathematic Equation 1, $\lambda(T)$ is thermal conductivity, $\alpha(T)$ is thermal diffusivity, $Cp(T)$ is specific heat, and $\rho(T)$ is density.

When the density of the porous polymer resin layer is less than about 0.5 g/ml, pores may be excessively generated inside the porous polymer resin layer, thereby deteriorating mechanical strength such as weather resistance of the porous polymer resin layer.

When the density of the porous polymer resin layer is greater than about 1.6 g/ml, pores may not be sufficiently generated inside the porous polymer resin layer, and thus thermal conductivity and volume heat capacity may not be sufficiently reduced and the heat insulation effect may decrease.

The thermal conductivity of the porous polymer resin layer, as measured according to ASTM E1461, may be from about 0.02 W/mK to about 0.8 W/mK, from about 0.02 W/mK to about 0.25 W/mK, or particularly from about 0.03 W/mK to about 0.23 W/mK.

Thermal conductivity, as used herein, means a degree of transferring heat by conduction. In general, as thermal conductivity is reduced, transfer of thermal kinetic energy is reduced and thus thermal insulation may be increased.

When the thermal conductivity of the porous polymer resin layer is greater than about 0.8 W/mK, transfer of thermal kinetic energy may be greater than a predetermined amount, and thus the amount of thermal energy discharged outside the porous polymer resin layer may increase and thermal insulation may decrease, thereby decreasing energy efficiency.

Further, the volume heat capacity of the porous polymer resin layer, as measured according to ASTM E1269, may be from about 600 KJ/m$^3$K to about 2500 KJ/m$^3$K, from about 600 KJ/m$^3$K to about 2000 KJ/m$^3$K, from about 700 KJ/m$^3$K to about 1900 KJ/m$^3$K, or particularly from about 790 KJ/m$^3$K to about 1850 KJ/m$^3$K.

The volume heat capacity, as used herein, means a quantity of heat required to increase the temperature of material of unit volume by 1° C. For example, the volume heat capacity may be calculated by the following Mathematic Equation 2.

$$\text{Volume heat capacity (KJ/m}^3\text{K)} = \text{specific heat (KJ/g·K)} \times \text{density (g/m}^3\text{)} \quad \text{[Mathematic Equation 2]}$$

Since specific heat is a unique property of a material and represents a constant value, the volume heat capacity may be influenced by density.

In other words, when the density of the porous polymer resin layer decreases, volume heat capacity may decrease.

As discussed above, when the density of the porous polymer resin layer decreases, the thermal conductivity may decrease and the thermal efficiency improvement effect can be obtained, and the same effect may be obtained when the volume heat capacity decreases.

When the volume heat capacity of the porous polymer resin layer is greater than about 2500 KJ/m$^3$K, the volume heat capacity may not be sufficiently reduced, thereby increasing the density of the porous polymer resin layer. In addition, the thermal conductivity may also increase, and thus the suitable thermal insulation may not be obtained.

The porous polymer resin layer may include of about 0.1 wt % to 10 wt %, of about 5 wt % to 10 wt %, or particularly of about 6 wt % to about 8 wt % of the aerogels, based on the total weight of the porous polymer resin, and further include the balance of the binder resin constituting the total weight of the porous polymer resin.

When the content of the aerogels is less than about 0.1 wt %, it may be difficult to reduce the thermal conductivity and density of the porous polymer resin layer, and further it may be difficult to secure sufficient thermal insulation.

If the content of the aerogels is greater than about 10 wt %, excessive aerogels may be formed inside the porous polymer resin layer, and a part of the surface of the aerogel may be exposed on the surface of the porous polymer resin layer to generate unevenness on the surface thereof, thereby decreasing adherence to the inner wall of an internal combustion engine.

The binder resin may further comprise acryl resin, urethane resin, or non-water soluble silicon resin. Preferably, the non-water soluble silicon resin may be, but not limited to, for example, a silane modified compound, vinyl silane, siloxane oligomer, and the like.

As discussed above, the binder resin, as used herein, may have excellent heat resistance. The binder resin may include the aerogels and pores inside and be adhered to the inner wall of an internal combustion engine and the like, thereby improving the heat resistance of the porous polymer resin layer.

Further, mechanical properties such as adhesion to a metal, impact resistance, and the like can be improved.

The binder resin may have a weight average molecular weight of about 20,000 g/mol to 300,000 g/mol, or particularly of about 30,000 g/mol to 200,000 g/mol.

When the weight average molecular weight of the binder resin is less than about 20,000 g/mol, mechanical properties, heat resistance, and thermal insulation of the porous polymer resin layer may not be obtained.

When the weight average molecular weight of the binder resin is greater than about 300,000 g/mol, the uniformity or homogeneity of the porous polymer resin layer may be deteriorated.

The aerogel can be any commonly used aerogels without limitation. Particularly, the aerogel including a silicon oxide, carbon, a polyimide, a metal carbon, or a mixture of two or more kinds thereof may be used.

The specific surface area of the aerogel may be from about 400 cm$^3$/g to about 600 cm$^3$/g, or particularly from about 450 cm$^3$/g to about 550 cm$^3$/g.

As discussed above, the porous polymer resin layer according to various exemplary embodiments may include a binder resin and aerogels dispersed in the binder resin. In particular, when the binder resin may include pores having a mean maximum diameter of about 0.5 mm to 1.6 mm, direct contact of the binder resin and the aerogels may be minimized. Thus, the binder resin may not be penetrated or impregnated into the inside of the aerogels or pores included in the finally manufactured porous polymer resin layer.

The binder resin may not substantially exist inside the aerogels dispersed in the hinder resin, and for example, the binder resin may be present inside the aerogels in a content of 2 wt % or less, or 1 wt % or less based on the total weight of the binder resin.

The present invention also provides a method for preparing a porous polymer resin layer. The method may include: conducting a thermal decomposition by increasing a temperature of a polymer resin composition from a temperature of about 50° C. to a temperature of about 150° C., at a rate of about 3° C./min to 20° C./min. The polymer resin composition, as described above, may include a binder resin dispersed in a first solvent, and aerogels dispersed in a second solvent.

The first solvent, as used herein, may be an organic solvent or an aqueous solvent having a boiling temperature greater than a boiling point of the second solvent, preferably at least of about 110° C. or greater. The second solvent, as used herein, may be an organic solvent having a boiling temperature less than the first solvent, or less about 110° C.

The binder resin and the aerogels are described above with contents thereof in regard to the porous polymer resin layer.

Since the method for preparing a porous polymer resin layer includes a step of thermal decomposition, i.e. increasing the temperature of the polymer resin composition from a temperature of about 50° C. to a temperature of about 150° C. at a rate of about 3° C./min to 20° C./min, each thermally decomposable compound may absorb heat energy of a corresponding temperature to progress spontaneous decomposition and vaporization as the temperature of the polymer resin composition increases.

As discussed above, the mean maximum diameter of the pores may vary according to the kind of a solvent used for generating the pores and the temperature-raising condition.

The thermal decomposition step may include increasing the temperature from about 50° C. to about 150° C., from about 80° C. to about 120° C., or particularly from about 90° C. to about 110° C. The temperature may be increased at a rate of about 3° C./min to 7° C./min, or particularly of about 4° C./min to 6° C./min.

The mean maximum diameter of formed pores may be from about 1.0 mm to about 1.6 mm, from about 1.1 mm to about 1.2 mm, or particularly from about 1.11 mm to about 1.13 mm.

Alternatively, the thermal decomposition step may include increasing the temperature from about 50° C. to about 150° C., from about 80° C. to about 120° C., or particularly from about 90° C. to about 110° C. The temperature may be increased at a rate of about 13° C./min to 17° C./min, or particularly of about 14° C./min to 16° C./min.

The mean maximum diameter of thus formed pores may be from about 0.5 mm to about 0.9 mm, from about 0.8 mm to about 0.9 mm, or particularly from about 0.81 mm to about 0.85 mm.

When the temperature-increasing rate in the thermal decomposition step is less than a predetermined value, for example, less than about 3° C./min, an intermolecular cross-linking structure of the binder resin included in the polymer resin composition may not be adequately formed, thereby decreasing mechanical properties such as impact resistance, adhesion, and the like.

If the temperature-raising rate in the thermal decomposition step is too high, solvent vaporization time may be shortened to reduce the size of pores included in the porous polymer resin layer.

The polymer resin composition may include a binder resin dispersed in the first solvent, and aerogels dispersed in the second solvent, each first and second solvent can be used as described above.

As the binder resin is dispersed in the first solvent, and the aerogels are dispersed in the second solvent, particularly when the first solvent has a greater boiling temperature than the second solvent, the solvent-dispersion phase of the binder resin and the solvent-dispersion phase of the aerogels may be uniformly mixed without agglomeration, and the polymer resin composition may have a homogeneous composition.

Moreover, since the first solvent and the second organic solvent are may not be miscible to each other, or may not be easily dissolved in or mixed with each other, and the binder resin is dispersed in the first solvent and the aerogels are dispersed in the second solvent, direct contact between the binder resin and the aerogels may be minimized until the polymer resin composition is coated and dried, and penetration or impregnation of the binder resin into the inside of the aerogels or pores may be prevented.

Further, since the second solvent has affinity with the first solvent, the aerogels dispersed in the second solvent can be physically mixed with the binder resin dispersed in the first solvent and be uniformly distributed, as well as the hinder resin can be uniformly distributed in the first organic solvent.

The polymer resin composition obtained by dispersing a binder resin and aerogels respectively in a predetermined solvent and then mixing, and the porous polymer resin layer obtained therefrom may have reduced thermal conductivity and low density, and still secure high mechanical properties and heat resistance. Further, when the polymer resin composition is applied to an internal combustion engine, heat energy discharged outside may be reduced thereby improving internal combustion engine efficiency and fuel efficiency of the vehicle.

The solid content of the binder resin in the first solvent may not be specifically limited. Preferably, the solid content thereof may be from about 5 wt % to about 75 wt %, based on the total weight of the binder resin considering uniformity or physical properties of the porous polymer resin composition.

In addition, the solid content of the aerogels in the second solvent may not be specifically limited. Preferably, the solid content thereof may be from about 5 wt % to about 75 wt %, based on the total weight of the aerogel considering uniformity or physical properties of the polymer resin composition.

As discussed above, since the first solvent and the second solvent are not easily dissolved in or mixed with each other, direct contact between the binder resin and the aerogels may be minimized before the polymer resin composition is coated and dried, and penetration or impregnation of the binder resin into the inside of the aerogels or pores may be prevented.

In particular, the boiling point difference between the first solvent and the second solvent may be of about 10° C. or greater, of about 20° C. or greater, of about 10° C. to 200° C., of about 50° C. to 100° C., or particularly of about 60° C. to 80° C.

The first solvent may have a boiling point at least of about 110° C. or greater. first solvent may be an organic solvent that may include xylene, anisole, toluene, methyl ethyl ketone, methyl isobutyl ketone and ethylene glycol monomethylether, ethylene glycol monoethyl ether, ethylene glycol monobutylether, butyl acetate, cyclohexanone, ethylene glycol monoethyl ether acetate (BCA), benzene, DMSO, N,N'-dimethylformamide, or a mixture thereof. Alternatively, the first solvent may be an aqueous solvent that may include water, methanol, ethanol, ethylacetate, or a mixture thereof.

The second solvent may have a boiling point of less than about 110° C. The second solvent may include methyl alcohol, ethyl alcohol, propyl alcohol, n-butyl alcohol, isobutyl alcohol, tert-butyl alcohol, acetone, methylene chloride, ethylene acetate, hexane, isopropyl alcohol, or a mixture thereof.

Before the thermal decomposition step, the method may further comprise a step of heat treating the polymer resin composition at a temperature of about 50° C. to 90° C.

When the polymer resin composition is heat treated at 50° C. to 90° C. before the temperature-raising step, a part of thermally decomposable compounds or solvents included in the polymer resin composition may vaporize to form pores inside the porous polymer resin layer. Particularly, when heat treating the polymer resin composition, the temperature may be increased from a temperature of about 50° C. to 90° C., or particularly of about 60° C. to 80° C. Further, the temperature may be increased at a rate of about 0.5° C./min to 5° C./min, or particularly of about 1° C./min to 3° C./min.

After the thermal decomposition, the method may further comprise a step of heat treating the polymer resin composition at a temperature of about 180° C. to 300° C.

When the polymer resin composition is heat treated at the temperature of about 180° C. to 300° C. after the thermal decomposition, the porous polymer resin composition may lose flowability due to a chemical change or a physical change such as drying at a certain curing temperature, thereby increasing the intensity of the porous polymer resin layer.

When the curing temperature is less than about 180° C., curing speed may be reduced, and an intermolecular cross-linking structure of the binder resin included in the porous polymer resin composition may not be adequately formed, thereby decreasing mechanical properties such as impact resistance, adhesion, and the like.

Further, when the curing temperature is greater than about 300° C., curing may rapidly occur, and the molecular chains of the binder resin included in the porous polymer resin composition may rapidly react to form excessive intermolecular cross-linking structures, and thus the size of pores inside the porous polymer resin layer may be reduced thereby decreasing the thermal insulation property.

The thus prepared porous polymer resin layer may be, but not limited to, coated on the inner side of an internal combustion engine or the outer side of internal combustion engine parts. The coating method is not specifically limited, but typically used coating methods, for example, spray coating, may be used without limitation.

According to various aspects of the present invention, the porous polymer resin layer having reduced density, thermal conductivity, and volume heat capacity may provide high heat resistance. In particular, when the porous polymer resin is applied for an internal combustion engine, heat energy discharged outside may be reduced thereby improving the internal combustion engine efficiency and the fuel efficiency of the vehicle.

Hereinafter, the present invention will be explained in detail with reference to the following examples. However, these examples are only to illustrate the inventive concept, and the scope of the inventive concept is not limited thereto.

EXAMPLE

Examples 1 and 2: Manufacture of Porous Polymer Resin Layer (1) Preparation of Polymer Resin Composition Porous silica aerogels dispersed in hexane (specific surface area: about 500 cm$^3$/g) and polydimethylsiloxane precursor dispersed in xylene were introduced into a reactor, zirconia beads (440 g) were added thereto, and the mixture was ball milled at 200 rpm under room temperature and atmospheric pressure conditions to prepare a polymer resin composition.

(2) Formation of Porous Polymer Resin Layer

The polymer resin composition was coated on an engine piston of a vehicle by spray coating.

Further, it was heat treated at 80° C. using a convection oven to vaporize hexane.

Thereafter, it was heated at a temperature-raising rate of 2° C./min to vaporize all moisture at 100° C.

After the moisture vaporization, it was heated at a temperature-raising rate of the following Table 1 to vaporize xylene.

After the vaporization of xylene, it was heat treated at the curing temperature of the following Table 1 for more than 60 minutes, to cure the porous polymer resin composition, thereby forming a porous polymer resin layer.

The contents of the aerogels and polydimethylsiloxane resin included in the porous polymer resin layer are as described in the following Table 1.

Comparative Example 1: Manufacture of Porous Polymer Resin Layer

A porous polymer resin layer was manufactured by the same method as in Example 1, except for changing the temperature-increasing rate and the curing temperature as shown in the following Table 1.

Comparative Examples 2 and 3: Manufacture of Porous Polymer Resin Layer

A porous polymer resin layer was manufactured by the same method as in Example 1, except for changing the contents of aerogels and polydimethylsiloxane resin as shown in the following Table 1.

Comparative Example 4: Manufacture of Porous Polymer Resin Layer

A porous polymer resin layer was manufactured by the same method as in Example 2, except for changing the contents of aerogels and polydimethylsiloxane resin as shown in the following Table 1.

TABLE 1

Compositions and manufacturing conditions of porous polymer resin layers of examples and comparative examples

|  | Aerogel (wt %) | Polydimethylsiloxane resin (wt %) | Temperature increasing rate (° C./min) | Curing temperature (° C.) |
|---|---|---|---|---|
| Ex. 1 | 7.5 | 92.5 | 5 | 200 |
| Ex. 2 | 7.5 | 92.5 | 15 | 250 |
| C. Ex. 1 | 7.5 | 92.5 | 1 | 120 |
| C. Ex. 2 | 0 | 100 | 5 | 200 |
| C. Ex. 3 | 0.1 | 99.9 | 5 | 200 |
| C. Ex. 4 | 0.1 | 99.9 | 15 | 250 |

Experimental Example: Measurement of Physical Properties of Porous Polymer Resin Layers Obtained in Examples and Comparative Examples The physical properties of the porous polymer resin layers obtained in the Examples and Comparative Examples were measured as follows, and the results are shown in Tables 2 and 3.

1. Thickness (μm)

The thicknesses of the porous polymer resin layers obtained in Examples and Comparative Examples were measured under room temperature and atmospheric pressure conditions using an ultrasonic thickness gauge.

2. Density (g/ml)

For the porous polymer resin layers obtained in the Examples and Comparative Examples, the degrees of influence of alcohol and water absorbed into the coating layer on buoyancy were measured under room temperature atmospheric conditions using a density mirror (YKD, Sartorius, Germany).

3. Maximum Pore Diameter (mm)

For the porous polymer resin layers obtained in the Examples and Comparative Examples, 5 to 15 pores were randomly selected and the maximum diameters of the pores were measured using an optical microscope.

4. Thermal Conductivity (W/mK)

For the porous polymer resin layers obtained in the Examples and Comparative Examples on a piston, thermal conductivities were measured according to ASTM E1461 under room temperature and atmospheric conditions by thermal diffusion measurement using a laser flash method.

5. Volume Heat Capacity (kJ/m$^3$K)

For the coating layers obtained in the Examples and Comparative Examples on a piston, specific heat was measured according to ASTM E1269 at room temperature using a differential scanning calorimetry (DSC) device with reference to sapphire, to confirm heat capacity.

The results of the experimental examples are described in the following Tables 2 and 3.

TABLE 2

Measurement results of maximum pore diameter of the Examples and Comparative Examples

|  | Ex. 1 | Ex. 2 | C. Ex. 1 | C. Ex. 2 | C. Ex. 3 | C. Ex. 4 |
|---|---|---|---|---|---|---|
| 1 | 1.388 | 1.233 | 0.233 | No pores generated | | |
| 2 | 1.208 | 0.925 | 0.652 | | | |
| 3 | 1.336 | 0.694 | 0.267 | | | |
| 4 | 0.833 | 0.848 | 0.214 | | | |
| 5 | 0.913 | 0.478 | 0.113 | | | |
| 6 | 0.982 | 0.913 | 0.331 | | | |
| 7 | 1.165 | 0.799 | 0.217 | | | |
| 8 | 1.135 | 0.719 | 0.144 | | | |
| Mean value | 1.120 | 0.826 | 0.271 | | | |

As shown in the Table 2, when porous polymer resin layers of Comparative Examples 2 to 4 included polydimethylsiloxane resin contents of 99.9 wt % or greater, no pores were generated inside.

Further, when the porous polymer resin layer of Comparative Example 1 was formed by increasing the temperature of thermal decomposition at a rate of 1° C./min, pores were generated, however, the mean maximum diameter was small as 0.271 mm.

To the contrary, when the porous polymer resin layers of Examples 1 and 2, were formed by increasing the temperature at a rate of 5° C./min or greater and the curing temperature thereof was 200° C. or greater, and the contents of aerogels and polydimethylsiloxane resin were appropriately controlled, pores respectively having a mean maximum diameter of 1.120 mm and 0.826 mm were formed.

TABLE 3

Results of experimental examples

|  | Thickness (μm) | Density (g/ml) | Thermal conductivity (W/mK) | Volume heat capacity (KJ/m$^3$K) |
|---|---|---|---|---|
| Ex. 1 | 213 | 0.531 | 0.039 | 794 |
| Ex. 2 | 235 | 1.23 | 0.221 | 1841 |
| C. Ex. 1 | 184 | 1.88 | 0.349 | 2814 |
| C. Ex. 2 | 151 | 2.56 | 0.721 | 3919 |
| C. Ex. 3 | 130 | 1.94 | 0.567 | 3221 |
| C. Ex. 4 | 178 | 2.24 | 0.557 | 3,259 |

As shown in the Table 3, when the porous polymer resin layers were formed according to Examples 1 and 2, the pores were sufficiently formed inside, thus exhibiting low density of 0.531 g/ml and 1.23 g/ml, and thus low thermal conductivity and volume heat capacity were measured, indicating excellent thermal efficiency.

To the contrary, when the porous polymer resin layers were formed according to Comparative Examples 1 to 4, the pores were not sufficiently formed or not formed at all inside, thereby having high density of 1.88 g/ml or more, and thus high thermal conductivity and volume heat capacity were measured compared to the examples, indicating a thermal efficiency decrease.

What is claimed is:

1. A porous polymer resin layer, comprising:
   a binder resin comprising pores and
   an aerogel dispersed in the binder resin,
   wherein the pores have a mean maximum diameter of about 0.5 mm to about 1.6 mm,
   wherein the porous polymer resin layer has a density of about 0.5 g/ml to 1.6 g/ml, and
   wherein the porous polymer resin layer comprises an amount of about 5 wt % to 10 wt % of the aerogel and the binder resin constituting the balance of the weight of the porous polymer resin layer.

2. The porous polymer resin layer according to claim 1, wherein the porous polymer resin layer is used for coating of the inner side of an internal combustion engine or parts of an internal combustion engine.

3. The porous polymer resin layer according to claim 1, wherein the porous polymer resin layer has a thickness of about 20 μm to 2000 μm.

4. The porous polymer resin layer according to claim 1, wherein the porous polymer resin layer has a volume heat capacity of about 600 KJ/m$^3$K to 2500 KJ/m$^3$K, as measured according to ASTM E1269.

5. The porous polymer resin layer according to claim 1, wherein the binder resin comprises a non-water soluble silicon resin.

6. The porous polymer resin layer according to claim 1, wherein the binder resin has a weight average molecular weight of about 20,000 g/mol to 300,000 g/mol.

7. The porous polymer resin layer according to claim 1, wherein the aerogel has a specific surface area of about 400 cm$^3$/g to 600 cm$^3$/g.

8. The porous polymer resin layer according to claim 1, wherein an amount of about 2 wt % or less of the binder resin is present inside the aerogel.

9. The porous polymer resin layer according to claim 1, wherein pores have a mean maximum diameter of about 0.5 mm to 0.9 mm.

10. The porous polymer resin layer according to claim 1, wherein the pores have a mean maximum diameter of about 1.0 mm to 1.6 mm.

11. A vehicle part that comprising a porous polymer resin layer of claim 1.

* * * * *